United States Patent
Zaitsev et al.

(10) Patent No.: US 9,710,701 B2
(45) Date of Patent: Jul. 18, 2017

(54) HANDWRITING DATA SEARCH

(71) Applicant: Lenovo (Singapore) Pte. Ltd., Singapore (SG)

(72) Inventors: Grigori Zaitsev, Durham, NC (US); Russell Speight VanBlon, Raleigh, NC (US); Jianbang Zhang, Cary, NC (US); Song Wang, Cary, NC (US); Bradley Park Strazisar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/669,628

(22) Filed: Mar. 26, 2015

(65) Prior Publication Data

US 2016/0283785 A1 Sep. 29, 2016

(51) Int. Cl.
*G06K 9/62* (2006.01)
*G06K 9/00* (2006.01)
*G06F 17/30* (2006.01)

(52) U.S. Cl.
CPC ......... *G06K 9/00402* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 6,005,973 | A * | 12/1999 | Seybold | G06K 9/00872 382/187 |
| 6,330,359 | B1 * | 12/2001 | Kawabata | G06F 3/03545 382/188 |
| 6,785,417 | B1 | 8/2004 | Williamson et al. | |
| 8,755,604 | B1 * | 6/2014 | Gross | G06K 9/72 382/181 |
| 2005/0135678 | A1 * | 6/2005 | Wecker | G06F 3/04883 382/186 |
| 2007/0189613 | A1 | 8/2007 | Tanaka | |

FOREIGN PATENT DOCUMENTS

| | | |
|---|---|---|
| WO | 03065246 A1 | 8/2003 |
| WO | 2015059930 A1 | 4/2015 |

OTHER PUBLICATIONS

Hinckley et al., "InkSeine: In Situ Search for Active Note Taking", CHI 2007, Apr. 28-May 3, 2007, San Jose, California, USA, Copyright 2007 ACM, pp. 251-260.*
Wlodarz, "Windows 8.1 + OneNote: Why the digital notebook is finally a reality", from www.betanews.com, captured on Apr. 5, 2016, published in 2014, pp. 1-10.*

* cited by examiner

*Primary Examiner* — Brian P Werner
(74) *Attorney, Agent, or Firm* — Ference & Associates LLC

(57) ABSTRACT

One embodiment provides a method, involving: accepting, at an input and display device, handwriting ink strokes; analyzing, using a processor, the handwriting ink strokes; producing search data based on the analyzing; searching, using a processor, existing handwriting data based on the search data; returning, on the input display and device, at least one result based on the searching. Other aspects are described and claimed.

20 Claims, 6 Drawing Sheets

HANDWRITING DATA SEARCH

BACKGROUND

Information handling devices ("devices"), for example cell phones, smart phones, tablet devices, laptop computers, and the like permit users to input handwriting using a finger or pen/stylus. This allows users to write more naturally and without the use of a keyboard. Because of this more users are storing their information (e.g., notes, documents, etc.) in an electronic handwritten format.

However, this creates issues if a user wishes to locate a particular handwritten document or word. Typically, a user searches a document that has machine text (e.g., a word document, spreadsheet, etc.), however, user handwriting is not machine recognizable. Therefore, the handwriting must be converted into machine text (e.g., using handwriting recognition software or an optical character recognition engine (OCR), referred to herein collectively as "OCR") in order to be searched. However, the current OCR software applications are prone to fault when processing human handwriting. Therefore, a solution is needed that improves the accuracy and capability of a user initiated search of their electronically stored handwriting documents.

BRIEF SUMMARY

In summary, one aspect provides a method, comprising: accepting, at an input and display device, handwriting ink strokes; analyzing, using a processor, the handwriting ink strokes; producing search data based on the analyzing; searching, using a processor, existing handwriting data based on the search data; returning, on the input and display device, at least one result based on the searching.

Another aspect provides an information handling device, comprising: a processor; an input and display device; a memory device that stores instructions executable by the processor to: accept handwriting ink strokes; analyze the handwriting ink strokes; produce search data based on the analyzing; search existing handwriting data based on search data; return at least one result based on the searching.

A further aspect provides a product, comprising: a storage device having code stored therewith, the code being executable by a processor and comprising: code that accepts, at an input and display device, handwriting ink strokes; code that analyzes, using the processor, the handwriting ink strokes; code that produces search data based on the analyzing; code that searches, using the processor, existing handwriting data based on the search data; code that returns, on the input display and device, at least one result based on the searching.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
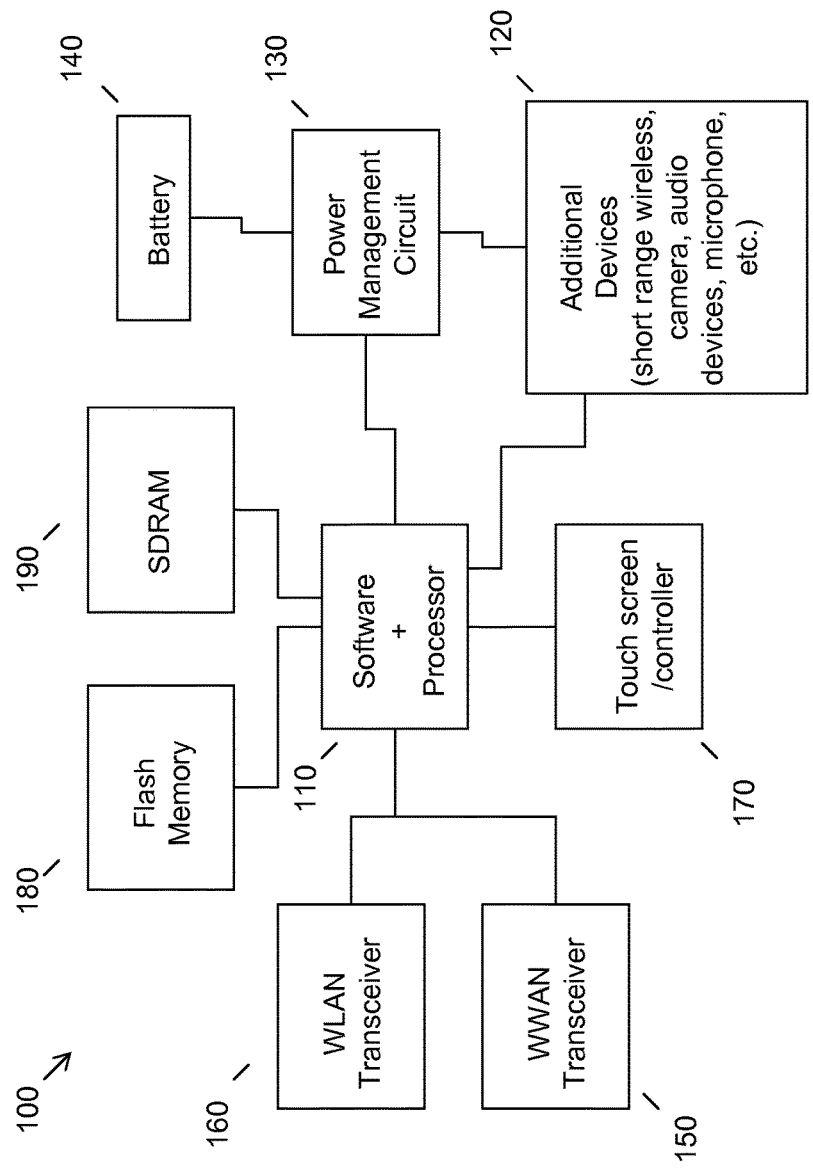
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although taking type written notes has become very popular in colleges and universities across the country and world, many people still prefer taking notes in the traditional handwritten method. Not only can taking handwritten notes allow for more flexibility (e.g., being able to write in varying styles, included sketches, etc.), for many it is more natural and the preferred method of recording their information.

This has lead to a demand for the ability to take handwritten notes on electronic devices. In order to meet this demand, many devices, such as tablets, computers, and smartphones have begun to include touch surfaces that allow a user to input handwriting directly onto them. The technology can vary, and some even use a more advanced digitizer system to which allows for greater control and variability during the handwriting process. Using these electronic devices enables a user to store all of their handwritten notes electronically. This reduces the clutter and potential risk of losing physical paperwork. In addition, the handwriting input can be stored in a cloud based environment, thus giving the user access to their files no matter their location or device. For example, ONENOTE allows users to take hand written notes, and synchronizes those notes to the cloud and across all of the user's devices allowing them to share their notes with others, or access and edit them on any of their devices (e.g., a tablet, smartphone, computer, etc.).

ONENOTE is a registered trademark of Microsoft Corporation in the United States of America and other countries.

Because of easy to use programs like this, a user's library of handwritten notes can become quite extensive. The volume of different documents and different subject matter can become cumbersome for the user to organize and track. This is similar to the difficulty users experienced with their plethora of documents saved on a typical computer. Computers solved this problem for machine input documents (e.g., a conventional word processing document having keyboard input) by allowing a user to enter a word or portion of the document subject matter into search tool and locating the document via searching the title and text content of the document. However, a computer cannot find a handwritten document in a vast sea of handwritten documents so easily.

Currently, if a user wishes to search handwritten documents, the only option is to use the note taking software (e.g., ONENOTE) or a third party application that performs an optical character recognition scan of the documents and converts or correlates the handwritten input into corresponding machine text.

This technical issue presents problems for a user in that they are unable to easily retrieve desired documents or the relevant portions of the desired documents. This is because OCR is prone to error and thus having it as a single point of failure in the search process is problematic. When a user enters machine text in an effort to search their handwritten notes, the current solution is to compare that user entered machine text against what the OCR process interpreted the existing handwriting data to be. For example, if a user enters, via keyboard a search query for "mask," the search tool only searches for that specific term. However, it is possible that the OCR interpreted the handwritten word "mask" as "mark," and thus the search query would be unsuccessful.

Accordingly, an embodiment provides a method of accepting handwriting ink strokes on an input device (e.g., tablet, smartphone, laptop, etc.). For example, using a stylus to write the word "grocery" on a tablet device. Once the input is received, the handwriting ink strokes are analyzed (e.g., OCR is preformed, the handwriting is converted to a vector coordinate system, etc.). Using this analyzed data, a search is conducted through a collection of existing handwriting data (e.g., the user's previous handwriting input) for the term "grocery." Once a matching term is found (e.g., a previous handwritten document with the term "grocery" included) it is displayed to the user. Stated differently, a user searches their existing handwriting entries using handwriting input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering. System 100 also typically includes various memory devices, for example flash memory 180 and SDRAM 190.

Figure 2:
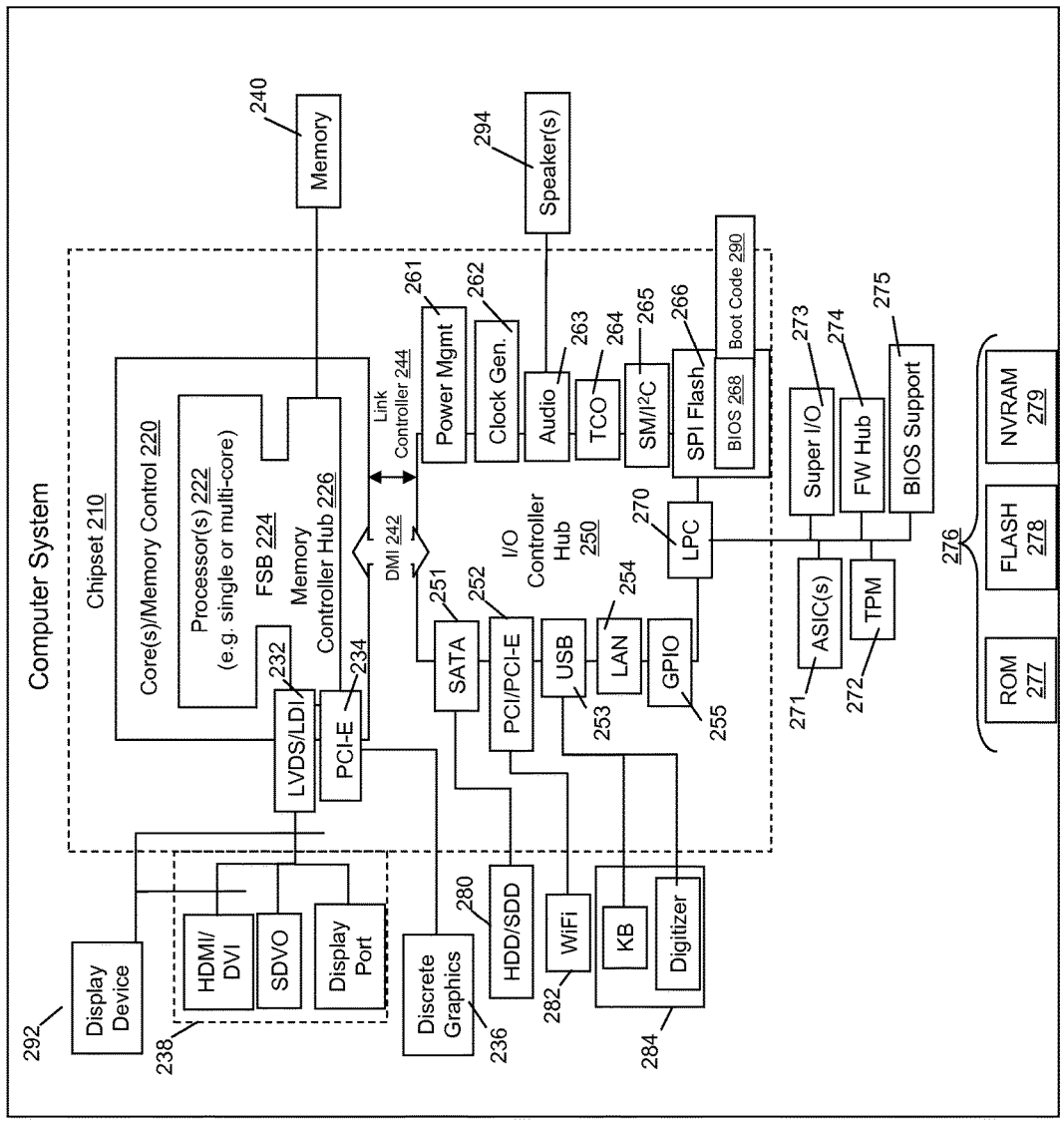
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices. For example, the circuitry outlined in FIG. 1 may be implemented in a tablet or smart phone embodiment, whereas the circuitry outlined in FIG. 2 may be implemented in a personal computer embodiment.

Figure 3:
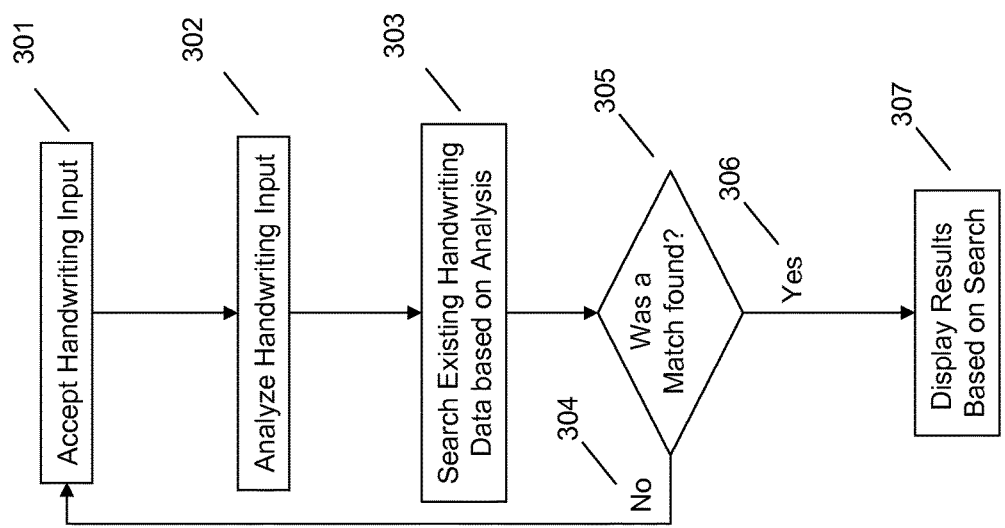
FIG. 3 illustrates an example method of searching handwriting data based on handwriting input.

Referring now to FIG. 3, an embodiment receives handwriting input at 301. The handwriting input is received on a touch sensitive device (e.g., a tablet, smartphone, laptop with touch screen, or any such touch screen device). The input can be any typical method of input such as a finger or stylus (e.g., a capacitive stylus, a resistive stylus, a surface acoustic wave stylus, an active digitizer stylus, etc.). The handwriting input can consist of any available characters, including letters, numbers, symbols, etc.

The handwriting input is entered at 301 by a user for example in a search tool in order to search through existing handwritten files for specific character strings (e.g., words, numbers, phrases, etc.). For example, a user may write the term "mask" in order to search for some earlier notes regarding masks. In an embodiment, the handwriting input "mask" is analyzed at 302. This analysis is carried out in order to allow the search tool to compare the user's handwriting input "mask" with that of the existing handwriting input stored on a local or cloud device.

Therefore, in an embodiment, a search at 303 is carried out on the existing handwriting data based on the analysis of the handwriting input at 302. The existing hand writing data can be, as mentioned, data stored on a user's local device (e.g., on a tablet or memory card) or the data could be stored in a remote device or cloud storage service (e.g., a remote server, home computer, etc.). Once the search is complete, it is determined if a match is found at 305. If no match is found at 304, no action is taken (e.g., no results are displayed) and the user can enter a new handwriting term to be analyzed and searched. In an embodiment, if no match is found at 304 a message stating the search was a failure may be displayed.

However, if a match was found during the search at 306, the match is displayed to the user at 307. In an embodiment, there may be more than one match, and thus the user would be presented with a list of matches at 307. If the list is so extensive that it becomes cumbersome, an embodiment may determine the most relevant search results and display only those in a list of top-n search results. The number of results can be set by the user or predetermined by a software application.

Figure 4:
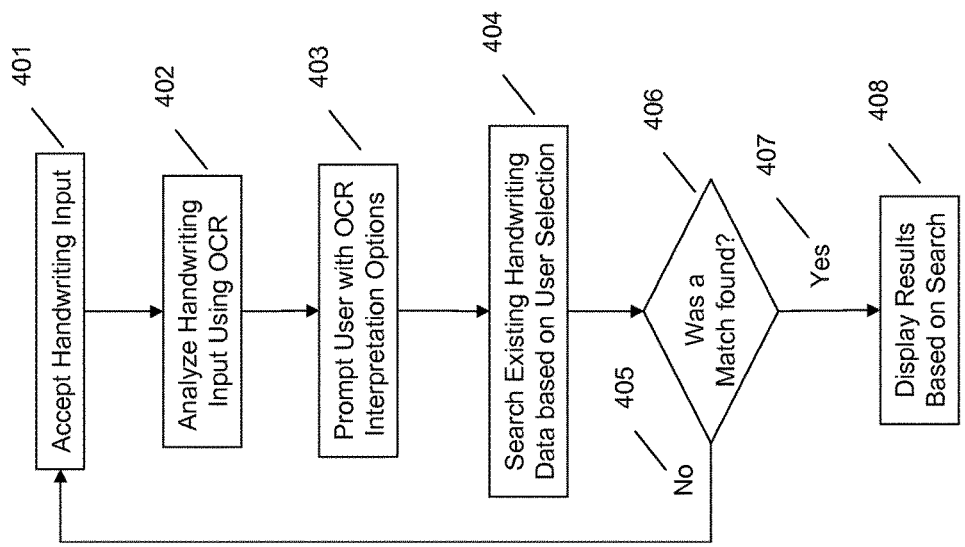
FIG. 4 illustrates an example method of searching handwriting data based on optical character recognition of handwriting input.

Referring now to FIG. 4, similar to above, an embodiment receives handwriting input at 401. The handwriting input can consist of any available characters, including letters, numbers, symbols, etc. The handwriting input is entered at 401 by a user in order to search through existing handwritten files for specific character strings (e.g., words, numbers, phrases, etc.). For example, a user may hand write the term "mask" in order to search for some earlier notes regarding masks.

In an embodiment the handwriting input is analyzed at 402. The analysis consists of interpreting the user's handwritten input and using optical character recognition (OCR) to convert the handwriting data into machine-encoded text. Additionally or alternatively, an embodiment may use optical word recognition (OWR), intelligent character recognition (ICR), or intelligent word recognition (IWR) or any similar software to convert handwriting in to machine text.

In another embodiment, once the handwriting input is analyzed, the user is presented with suggested machine text words at 403. For example, if a user entered the term "mask" as handwriting input, they may receive a list of words including: "mask," "wasp," "mark," "mean," and "munch" shown on the display as a form of autocorrect. The user could then select "mask" from the list to ensure that the character recognition carried out was correct. This analysis is carried out in order to allow the search tool to compare the user's handwriting input "mask" provided to the search tool in this instance with that of the existing hand writing input "mask" stored on the local or cloud device. The existing handwriting data "mask" has a corresponding machine text value. Thus, a similar OCR or equivalent process is carried out on the existing handwriting data either simultaneously, after, or prior to the user inputting handwriting search criteria 401.

An embodiment then searches the existing handwriting data based on the analysis at 404. The existing hand writing data can be handwriting data stored on a user's local device (e.g., on a tablet or memory card), or the data could be stored in a remote or cloud device (e.g., a remote server, etc.). Once the search is complete, it is determined if a match is found at 406. If no match is found at 405, no action is taken (e.g., no results are displayed) and the user can enter a new handwriting term to be analyzed and searched. In an embodiment, if no match is found at 405 a message stating the search was a failure could be displayed.

However, if a match is found during the search at 407, the match is displayed to the user at 408. As before, if the list is so extensive that it becomes cumbersome, an embodiment may determine the most relevant search results and display only those in a list of top-n results.

Figure 5:
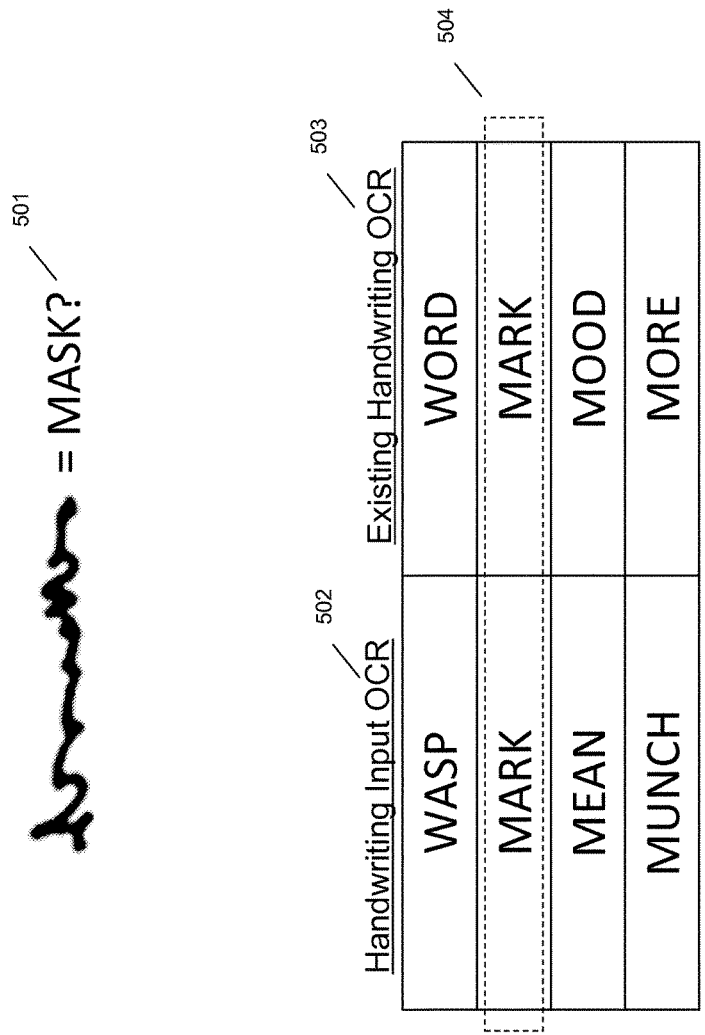
FIG. 5 illustrates an example of optical character recognition on handwriting input and existing handwriting data.

An embodiment may perform OCR on the handwriting input and not prompt the user to select the correct term. An embodiment could instead search the existing handwriting data with all the determined OCR possibilities. Referring briefly to FIG. 5, and by way of example, a user may enter the term "mask" as handwriting input at 501. Once the input is received, OCR is carried out and a list of possible words is created based on the character recognition for the handwriting input at 502 (e.g., wasp, mark, mean, munch). As shown in FIG. 5 it is possible that none of the recognized terms in at 502 are correct (i.e., the word "mask" is not included in the results). However, because the user is searching for a term they previously input as handwriting input, it is possible that the OCR carried out on the existing handwriting data 503 includes a match at 504. As shown in the example, both the handwriting input and some existing handwriting data contain the work "mark" as an OCR possibility.

Therefore, although neither the OCR procedure for the handwriting input, nor the OCR procedure for the existing handwriting data were correct in determining the actual intended word input by the user, the interpretation was consistent (precise) enough to still find a matching term, and the user may retrieve relevant documents using the handwriting input of "mask." This stands in contrast to the case where machine text (e.g., via keyboard) is input into the search tool, as the search would have failed to return the proper result due to the incorrect OCR on the existing (previous) handwriting data.

Figure 6:
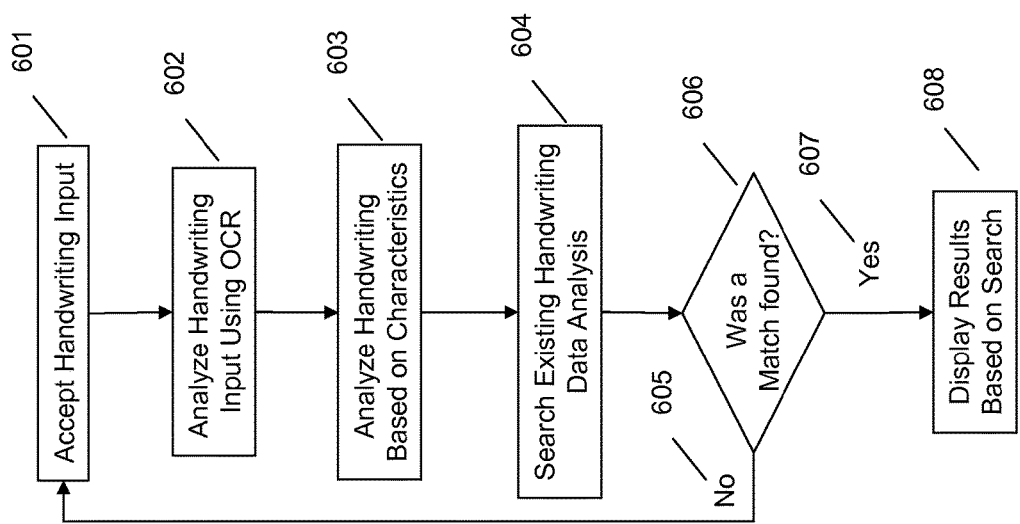
FIG. 6 illustrates an example method of searching handwriting data based on optical character recognition and characteristic analysis of handwriting input.

Referring now to FIG. 6, as with the previous examples, an embodiment accepts handwriting input is from the user at 601. The handwriting input is then analyzed using a form of OCR at 602. Additionally or alternatively, an embodiment may use optical word recognition (OWR), intelligent character recognition (ICR), or intelligent word recognition (IWR).

In an embodiment, the handwriting is analyzed based on a four dimensional system of characteristics (e.g., horizontal travel distance, vertical travel distance, input pressure, and input time) at 603. These characteristics are then converted into a computational representation understood by a machine (e.g., recording vectors of magnitude and direction of strokes, timing of strokes, locations of strokes relevant to other objects, etc.). These characteristics are also determined for the existing (previously entered) handwriting data stored on the local or remote machine.

An embodiment may render or convert the input handwriting into an image (e.g., bitmap, png, etc.) during the analysis at 603. The image data can be of individual characters, words, or phrases. In addition, the existing handwriting data stored on the local or remote machine would also be rendered or converted into an image format similar to that of the handwritings input. In a further embodiment, the rendered images are processed by an image processing application (e.g., digital image processing, optical image processing, analog image processing).

Once both OCR and a characteristic (e.g., four dimensional or image) analysis is complete a search is conducted of the existing handwriting data using the images at 604. The characteristics are then compared to those of the existing handwriting data to determine if there is a match at 606. An embodiment may use the OCR at 602 when conducting the search at 604, the analyzed characteristics at 603 when conducting the search at 604, or a combination of both.

If no match is found at 605, no action is taken (e.g., no results are displayed) and the user can enter a new handwriting term at 601 to be analyzed and searched. In an embodiment, if no match is found at 405 a message stating the search was a failure could be displayed.

However, if a match was found during the search at 607, the match is displayed to the user at 608. In an embodiment, there may be more than one match, and thus the user would be presented with a list of matches at 608. As before, if the list is so extensive that it becomes cumbersome, an embodiment may determine the most relevant search results and display only those in a list of top-n results. Wherein the number of results can be set by the user, or predetermined by a software application.

Accordingly, as illustrated by the example embodiments and figures, an embodiment provides a method of a user entering search criteria in the form of handwriting via an input and display device. This search criterion is then analyzed using one of the varieties of methods discussed above. A similar analyzing is carried out on the user's existing handwriting data, and a search is conducted to locate handwriting with a similar analysis in the existing handwriting data as that entered by the user for searching.

The various embodiments described herein thus represent a technical improvement to the process of searching handwritten information. Not only does the secondary OCR allow for a broader range of possible candidates to search with, it introduces the possibility that a user with consistent handwriting could locate their desired term even if the OCR is incorrect. This is because as shown in FIG. 5 the OCR would determine that the two entries share a common candidate, even though that candidate is incorrect. In addition, the ability to search by characteristics or image processing represents a clear technical improvement over the currently available methods.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, at an input and display device, handwriting ink strokes forming a word to be searched;
   analyzing, using a processor, the handwriting ink strokes to produce a list of candidate words corresponding to the word to be searched;
   searching, using a processor, using a plurality of words from the list of candidate words, existing computer readable text associated with prior handwriting data;
   said searching comprising identifying prior handwriting data having one or more of the list of candidate words associated therewith; and
   displaying, at least one result based on the searching.

2. The method of claim 1, wherein:
   the analyzing comprises determining a corresponding machine text value provided for searching the prior handwriting data.

3. The method of claim 2, wherein the handwriting data having a corresponding machine text value is generated from handwriting character recognition.

4. The method of claim 2, further comprising:
   displaying, on the input and display device, at least one search result corresponding to the machine text value of the handwriting ink strokes; and
   accepting, at the input and display device, user input selecting one of the at least one search results.

5. The method of claim 4, wherein the at least one search result is not an exact match to the handwriting ink strokes.

6. The method of claim 1, wherein the analyzing comprises determining at least one characteristic of the handwriting ink strokes, wherein the characteristic comprises at least one of horizontal travel distance, vertical travel distance, input pressure, and input time.

7. The method of claim 6 wherein the searching comprises comparing the at least one characteristic of the handwriting ink strokes to at least one characteristic of the existing handwriting data.

8. The method of claim 1, further comprising
   rendering, using the processor, at least one image based on the handwriting ink strokes; and
   rendering, using the processor, at least one image based on the existing handwriting data.

9. The method of claim 8, wherein the analyzing further comprises conducting an image analysis of the handwriting ink strokes.

10. The method of claim 9, wherein the searching comprises searching at least one image based to the existing handwriting data.

11. An information handling device, comprising:
    a processor;
    an input and display device;
    a memory device that stores instructions executable by the processor to:
    accept handwriting ink strokes forming a word to be searched;
    analyze the handwriting ink strokes to produce a list of candidate words corresponding to the word to be searched;
    search, using a plurality of words from the list of candidate words, existing computer readable text associated with prior handwriting data;
    said search comprising identifying prior handwriting data having one or more of the list of candidate words associated therewith; and
    display at least one result based on the searching.

12. The information handling device of claim 11, wherein:
    the analyzing comprises determining a corresponding machine text value provided for searching the prior handwriting data.

13. The information handling device of claim 12, wherein the handwriting data having a corresponding machine text value is generated from handwriting character recognition.

14. The information handling device of claim 12, wherein the instructions are further executable by the processor to:
    display, on the input and display device, at least one search result corresponding to the machine text value of the handwriting ink strokes; and
    accept, at the input and display device, user input selecting one of the at least one search results.

15. The information handling device of claim 14, wherein the at least one search result is not an exact match to the handwriting ink strokes.

16. The information handling device of claim 11, wherein the analyzing comprises:
    determining at least one characteristic of the handwriting ink strokes, wherein the characteristic comprises at least one of: horizontal travel distance, vertical travel distance, input pressure, and input time; and
    wherein the searching comprises comparing the at least one characteristic of the handwriting ink strokes to at least one characteristic of the existing handwriting data.

17. The information handling device of claim 11, wherein the instructions are further executable by the processor to:
    render, using the processor, at least one image based on the handwriting ink strokes; and
    render, using the processor, at least one image based on the existing handwriting data.

18. The information handling device of claim 17, wherein the analyzing further comprises conducting an image analysis of the handwriting ink strokes.

19. The information handling device of claim 18, wherein the searching comprises searching at least one image based to the existing handwriting data.

20. A product, comprising:
- a storage device having code stored therewith, the code being executable by a processor and comprising:
- code that accepts, at an input and display device, handwriting ink strokes forming a word to be searched;
- code that analyzes, using the processor, the handwriting ink strokes to produce a list of candidate words corresponding to the word to be searched;
- code that searches, using a plurality of words from the list of candidate words, existing computer readable text associated with prior handwriting data;
- said code that searches comprising code that identifies prior handwriting data having one or more of the list of candidate words associated therewith; and
- code that displays at least one result based on the searching.

\* \* \* \* \*